(12) United States Patent
Anderson et al.

(10) Patent No.: US 6,959,936 B2
(45) Date of Patent: Nov. 1, 2005

(54) VEHICLE SUSPENSION SYSTEM

(75) Inventors: Clyde C. Anderson, Portland, OR (US); Roger C. Nelson, Portland, OR (US)

(73) Assignee: NMHG Oregon, Inc., Portland, OR (US)

( * ) Notice: Subject to any disclaimer, the term of this patent is extended or adjusted under 35 U.S.C. 154(b) by 26 days.

(21) Appl. No.: 10/318,434

(22) Filed: Dec. 13, 2002

(65) Prior Publication Data

US 2004/0113383 A1  Jun. 17, 2004

(51) Int. Cl.$^7$ ................................................ B60G 9/02
(52) U.S. Cl. ...................... 280/124.111; 280/124.11; 280/124.177; 280/124.179
(58) Field of Search ................ 280/124.111, 124.11, 280/124.1, 124.112, 124.113, 124.164, 124.177, 280/124.179, FOR 128, FOR 129, FOR 130, 280/FOR 131, FOR 132, FOR 134, FOR 145, 280/FOR 173, FOR 181, FOR 184, FOR 185, 280/FOR 186, FOR 187, FOR 188

(56) References Cited

U.S. PATENT DOCUMENTS

| | | | |
|---|---|---|---|
| 1,120,036 A | | 12/1914 | Dearing |
| 1,164,925 A | * | 12/1915 | Clapp .................. 280/124.113 |
| 2,344,072 A | * | 3/1944 | Winkelmann ............... 180/360 |
| 2,835,507 A | | 5/1958 | Davies ........................ 280/112 |
| 2,978,050 A | * | 4/1961 | Risk et al. ..................... 180/9.5 |
| 3,738,665 A | * | 6/1973 | Bilco ............................. 277/3 |
| 3,778,080 A | * | 12/1973 | Bilco .................. 280/104.5 R |
| 3,872,941 A | | 3/1975 | Copeland ..................... 180/9.5 |
| 3,929,346 A | | 12/1975 | Keene et al. .................. 280/87 |
| 4,660,851 A | * | 4/1987 | Perlini ................... 280/124.11 |
| 4,721,187 A | * | 1/1988 | Riddle ......................... 187/9 E |
| 4,754,837 A | * | 7/1988 | McCormick ................ 180/253 |
| 4,813,512 A | * | 3/1989 | McCormick ................ 180/253 |
| 5,039,924 A | * | 8/1991 | Avitan ......................... 318/139 |
| 5,070,283 A | * | 12/1991 | Avitan ......................... 318/139 |
| 5,113,344 A | * | 5/1992 | Kellogg et al. ......... 364/424.04 |
| 5,123,081 A | * | 6/1992 | Bachman et al. ........... 388/934 |
| D335,741 S | * | 5/1993 | McCormick et al. ........ D34/35 |
| 5,617,724 A | * | 4/1997 | Ko ............................... 60/422 |
| 6,056,304 A | * | 5/2000 | Brambilla ............. 280/124.111 |
| 6,523,844 B2 | * | 2/2003 | Panizzolo ............. 280/124.111 |

FOREIGN PATENT DOCUMENTS

| | | | | |
|---|---|---|---|---|
| DE | 872007 | * | 3/1953 | ........ 280/FOR 181 |
| JP | 58-49432 | | 4/1983 | |
| JP | 58-218408 | | 12/1983 | |
| JP | 60124512 | | 7/1985 | |
| JP | 61-179009 | | 8/1986 | |
| JP | 03-73597 | | 3/1991 | |
| JP | 03193515 | | 8/1991 | |
| JP | 04-339005 | | 11/1992 | |
| JP | 06106930 | | 4/1994 | |
| SU | 1530519 | * | 12/1989 | ........ 280/FOR 181 |

* cited by examiner

*Primary Examiner*—Eric Culbreth
(74) *Attorney, Agent, or Firm*—Marger Johnson & McCollom, PC (57) ABSTRACT

A vehicle suspension system couples an axle to a vehicle frame so that the axle pivots about a first location with respect to the frame when the axle has a first range of articulation. The axle pivots about a second location with respect to the frame extending laterally out from the first location when the axle has a second range of articulation greater than the first range of articulation. When the axle exceeds the second range of articulation, the suspension system retains the axle in a substantially rigid contact with the vehicle frame.

28 Claims, 9 Drawing Sheets

FIG.1
(BACKGROUND)

FIG.2
(BACKGROUND)

FIG.3
(BACKGROUND)

FIG.4
(BACKGROUND)

VEHICLE SUSPENSION SYSTEM

BACKGROUND OF THE INVENTION

Figure 1:
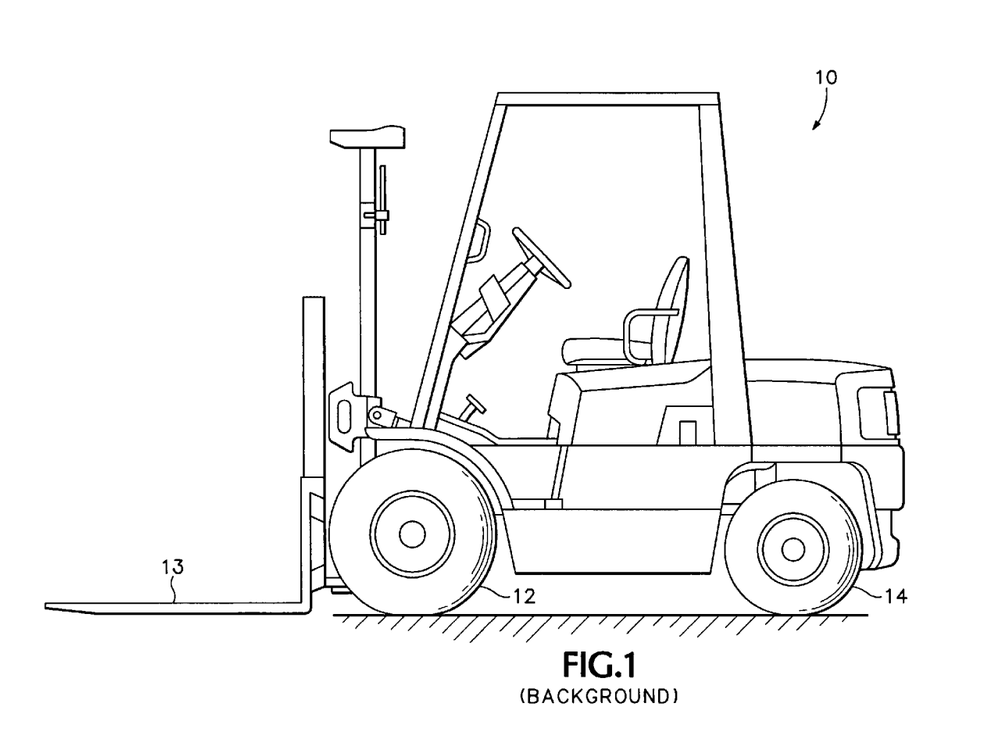
FIG. 1 is a drawing of a lift truck.

FIG. 1 shows a conventional lift truck 10 whose basic function of lifting and transporting cargo is well-known. Drive wheels 12 are connected to a drive axle (not shown) and steer wheels 14 are connected to a steer axle 20 shown in FIG. 2. The drive axle is rigidly connected to the frame of lift truck 10. The steer axle 20 is used for steering the truck 10 and includes a suspension system shown in more detail in FIG. 2.

Figure 2:
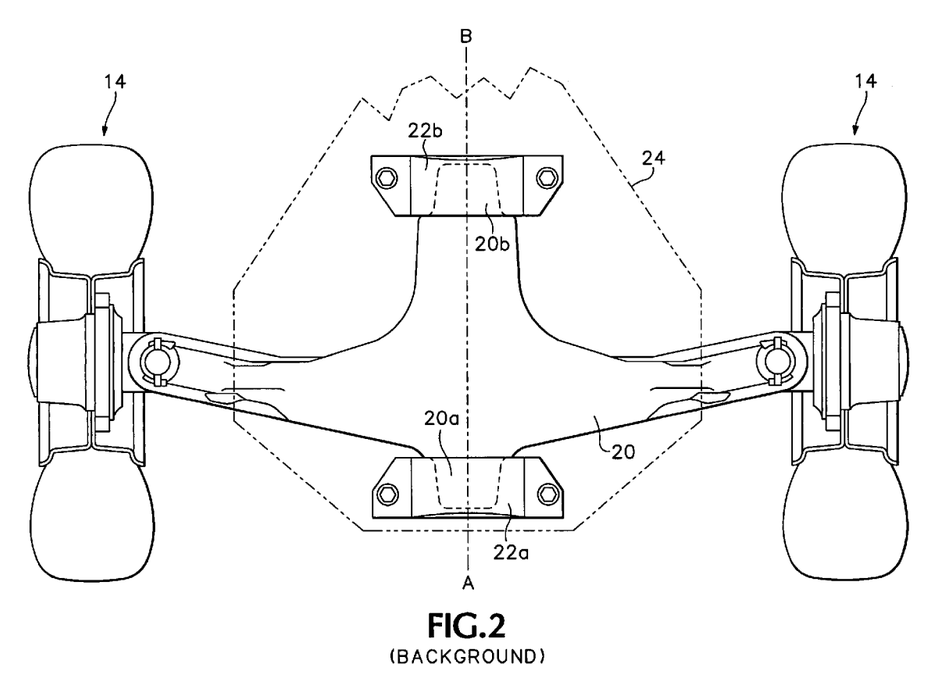
FIG. 2 is a top view of a steer axle used in the lift truck shown in FIG. 1.

FIG. 2 is a top-view of the steer axle 20 used in the lift truck 10 shown in FIG. 1. The rear wheels 14 are attached to opposite ends of the steer axle 20. Stubs 20A and 20B extend from the opposite back and front ends, respectively, of the steer axle 20. A pair of brackets 22A and 22B are bolted to the truck frame 24 and hold the stubs 20A and 20B, respectively.

Figure 3:
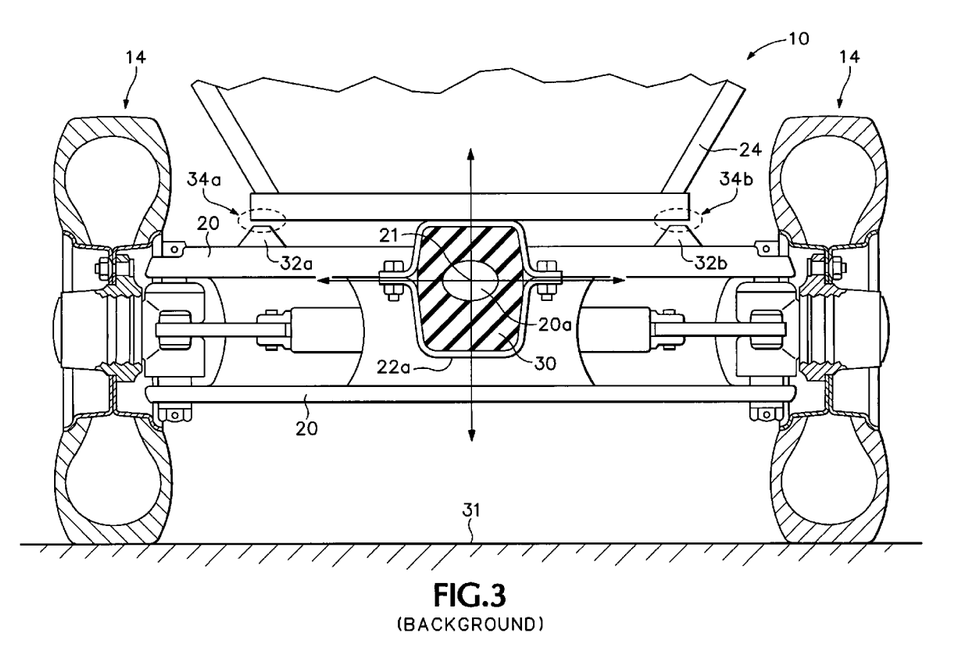
FIG. 3 is a rear sectional view of the steer axle shown in FIG. 2.

FIG. 3 is a rear sectional view of the steer axle 20. From this view, only bracket 22A is shown. Bracket 22B is similar to bracket 22A. The stub 20A of the steer axle 20 is centered about a center point 21. The stub 20A is held in substantially the same relative position within the bracket 22A about center point 21 by a rubber bushing 30. The rubber bushing 30 allows the steer axle 20 to pivot about the center point 21 when the steer axle 20 articulates (laterally inclines) either clockwise or counter clockwise.

Two articulation stops 32A and 32B are located on the upper surface of the steer axle 20. The spaces between the articulation stops 32A and 32B and the truck frame 24 are referred to as articulation gaps 34A and 34B, respectively. When the lift truck 10 is at rest, or traveling in a straight line on level terrain 31, there is little articulation of the steer axle 20 and the articulation gaps 34A and 34B remain relatively constant.

As long as the articulation stops 32A and 32B do not contact frame 24, the steer axle 20 is free to pivot about center point 21 independently of the frame 24. This pivoting of steer axle 20 allows the lift truck 10 to maneuver over uneven terrain and obstacles, or make turns, without effecting the lateral displacement of the frame 24.

The size of the articulation gaps 34A and 34B determine how far the steer axle 20 can articulate without laterally displacing the frame 24. If the steer axle 20 articulates far enough on one side, one of the articulation stops 32A or 32B contacts frame 24. In this articulation stop contact position, any further lateral articulation of the steer axle 20 equally articulates the frame 24.

Larger articulation gaps 34A and 34B can increase how much the steer axle 20 can articulate before one of the articulation stops 32A and 32B contacts frame 24. Larger articulation gaps 34A and 34B allow more articulation of the steer axle 20 without laterally displacing the frame 24.

Figure 4:
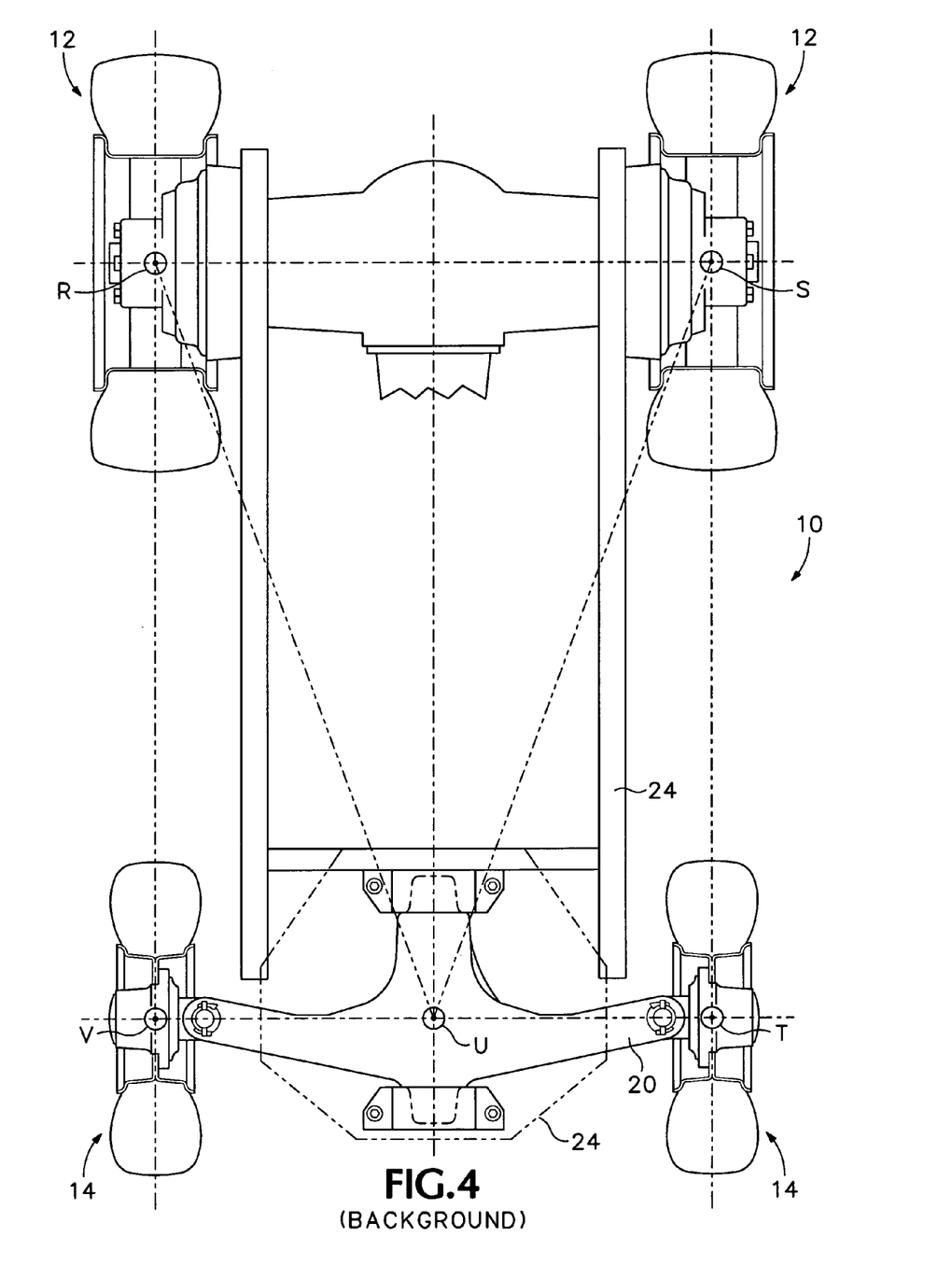
FIG. 4 is a top view of the chassis for the lift truck shown in FIG. 1.

FIG. 4 shows stability profiles for the suspension system shown in FIGS. 2 and 3. The lift truck 10 has a triangular stability profile RSU when the articulation stops 32A and 32B (FIG. 3) are not contacting the truck frame 24. With the triangular stability profile RSU, the lift truck frame 24 is supported at the R and S locations of drive tires 12 and at a U location along the centerline of the steer axle 20.

The lift truck 10 changes to more of a rectangular shaped stability profile RSTV when either of the articulation stops 32A or 32B come in contact with the frame 24. When the steer axle 20 pivots sufficiently to contact either one of the articulation stops 32A or 32B (FIG. 3), the steer axle 20 moves into a rigid non-pivoting relationship with the frame 24. This moves the lateral support locations for the rear end of frame 24 from centerline location U out to the T and V locations at the rear wheels 14.

SUMMARY OF THE INVENTION

A vehicle suspension system couples an axle to a vehicle frame so that the axle pivots about a first location with respect to the frame when the axle has a first range of articulation. The axle pivots about a second location with respect to the frame extending laterally out from the first location when the axle has a second range of articulation greater than the first range of articulation. When the axle exceeds the second range of articulation, the suspension system retains the axle in a substantially rigid contact with the vehicle frame.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 5:
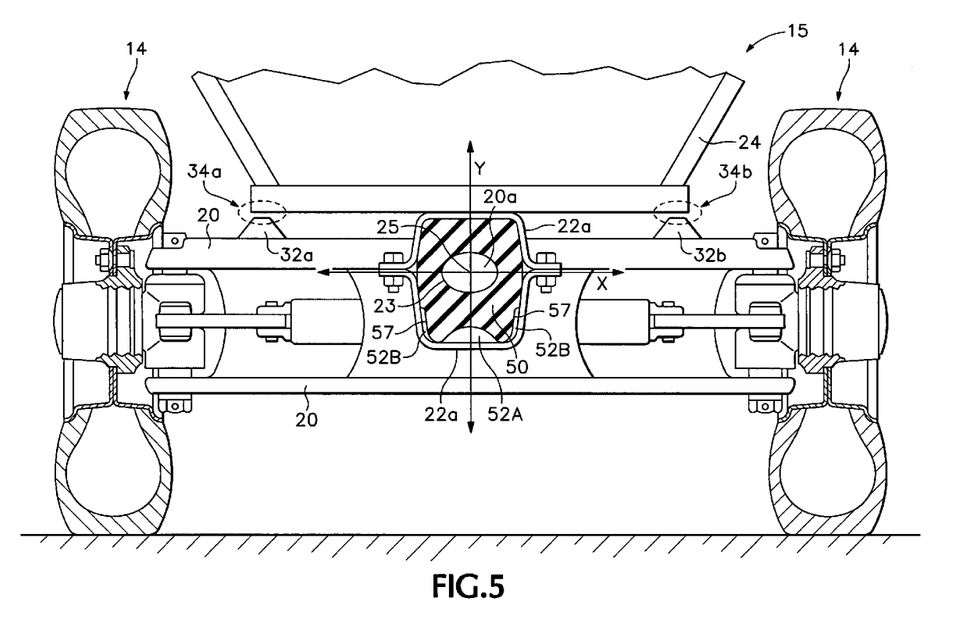
FIG. 5 is a rear sectional view of a suspension system according to one embodiment of the invention.

FIG. 5 shows a suspension system 15 that includes a bracket 22A rigidly connected to the truck frame 24. The bracket 22A contains a rubber bushing 50 having a hole 23 that receives the steer axle stub 20A previously shown in FIG. 2. A similar bushing 50 is also located at the front end of the steer axle 20 contained in the bracket 22B shown in FIG. 2.

The shape of bushings 50 promotes vertical compression or vertical movement of the bushing 50 when sufficient downward force is applied by the stub 20A. In one embodiment, the shape of bushing 50 forms cavities 52A and 52B between the bushing 50 and bracket 22A. In one embodiment, the bushing 50 forms a concave spacing 52A in the bottom of bracket 22A and lateral spaces 52B on the sides of bracket 22A. However, other bushing shapes can also be used that allow a vertical downward compression. Different types of elastomeric material can be used for the bushings 50.

Figure 6:
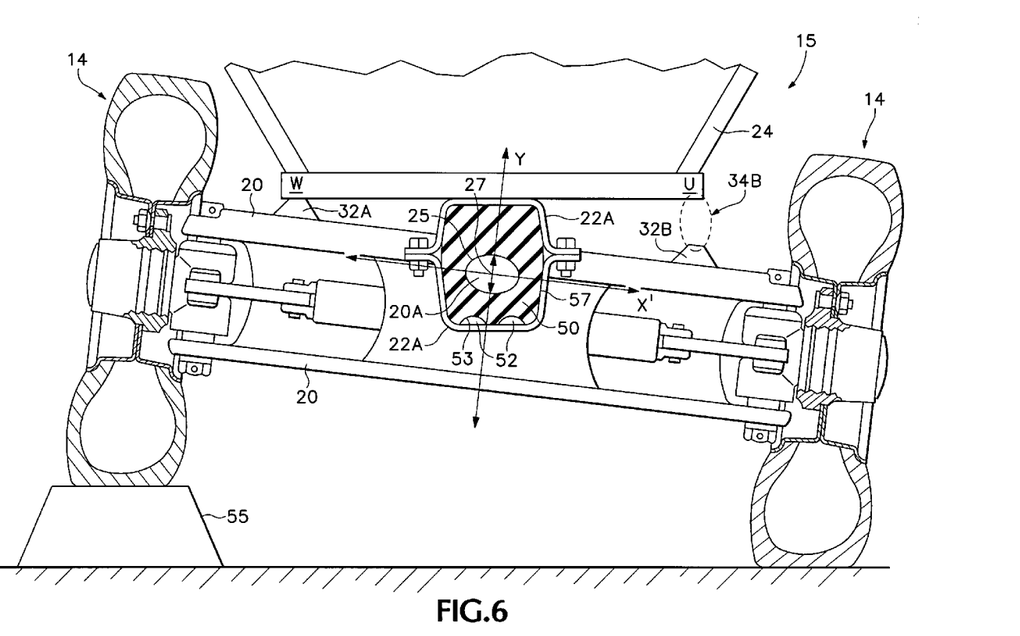
FIG. 6 is a rear view of the suspension system shown in FIG. 5 when the lift truck is traversing over uneven terrain.

When sufficient downward force is applied at the stubs 20A and 20B, the cavities 52A and 52B allow a potion of the bushing 50 to move downward enabling the center point 25 of the king pins 20A and 20B to also move in a downward vertical direction. FIG. 6 shows a rear view of the steer axle 20 while the tire for left steer wheel 14 traverses over an object 55. As the tire rolls over the object 55, the steer axle 20 pivots in a clockwise direction about the center point 25 previously shown in FIG. 5. The clockwise pivoting of the steer axle 20 moves the articulation stop 32A into contact with the frame 24.

If the articulation of steer axle 20 is large enough, the left end of rigid steer axle 20 continues to move upward after articulation stop 32A contacts frame 24. This causes the stub 20A to compress bushing 50 downward. The steer axle 20 in this condition pivots about articulation stop 32A at location W. The downward movement of the stub 20A moves the bushing 50 downward partially filling in gaps 52A and 52B (FIG. 5). The center points of stubs 20A and 20B move vertically downward from location 25 to location 27. The pivot point of the steer axle 20 effectively moves laterally out from center line y to the articulation stop 32A at location W.

The steer axle 20 may continue to articulate until a bottom end 53 and sides 57 of the rubber bushing 50 fill in a certain portion of the gaps 52A and 52B (FIG. 5). In this fully compressed state, the steer axle 20 and the frame 24 move into a semi-rigid fixed relationship with each other. Any additional articulation of the steer axle 20 at this point also articulates the frame 24.

In an alternative embodiment, rubber bushings, or some other type of elastomeric material, can be located on the tops of the articulation stops 32A and 32B. Alternatively, springs can be located on the articulation stops 32A and 32B. The elastic material or springs dampen the forces applied by the articulation stops 32A and 32B when contacting frame 24.

Figure 7:
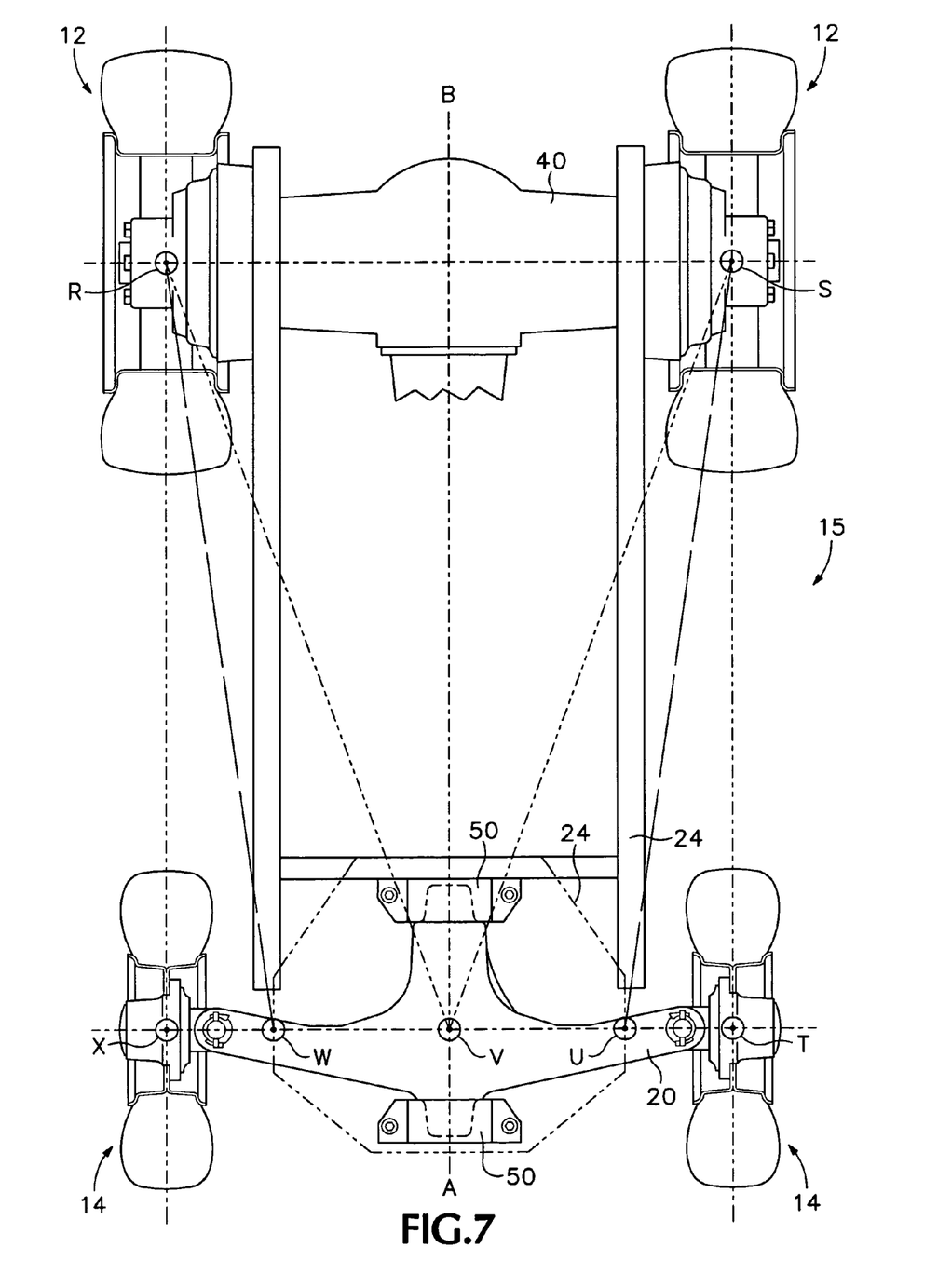
FIG. 7 is a top view of the lift truck chassis showing the stability profiles provided by the suspension system shown in FIGS. 5 and 6.

FIG. 7 is a top view of the chassis for the lift truck 10 shown in FIG. 1 that uses the suspension system 15 previously shown in FIGS. 5 and 6. The drive wheels 12 are attached to the drive axle 40 and the steer wheels 14 are attached to the steer axle 20. The drive axle 40 is rigidly affixed to frame 24 and does not pivot independently with respect to frame 24.

The steer axle 20 pivots about the frame centerline AB in a first articulation range prior to one of the articulation stops 32A or 32B (FIG. 5) contacting frame 24. In this articulation stop non-contact condition, the lift truck has the triangular stability profile RSV defined by the points R, S, and V.

When the steer axle 20 moves into a second articulation range, one of the articulation stops 32A or 32B contacts the frame 24 as previously shown in FIG. 6. This may happen, for example, when the tire for one of the steer wheels 14 travels over an object. When one of the articulation stops contact the frame 24, the lift truck 10 transitions from the triangular stability profile RSV to a trapezoidal stability profile RSUW corresponding to locations R, S, U, and W.

The points R and S correspond to locations on the drive wheels 12. The locations W and U correspond to the locations where the articulation stops 32A and 32B, respectively, contact the frame 24. After the articulation stop 32A or 32B contacts the frame 24, the steer axle stubs 20A and 20B start compressing bushing 50 in a downward direction as described above in FIG. 6. This allows the steer axle 20 (FIG. 6) to pivot about point W or point U.

The pivot point of the steer axle 20 effectively moves from location V to location W or location U. In the second articulation range when the truck 10 has the trapezoidal stability profile RSWU, the steer axle 20 still articulates semi-independently from the frame 24. This trapezoidal stability profile is caused by the vertical displacement of the stubs 20A and 20B inside of bushings 50 (FIG. 6).

In a third steer axle articulation range, the steer axle stubs 20A and 20B can no longer move downward in bushings 50. For example, when the gaps 52A and 52B (FIG. 5) are substantially filled in by portions of the rubber bushing 50. In this fully compressed bushing state, the lift truck 10 transitions to a stability profile RSXT approaching a rectangular shape. The stability profile RSXT is larger than the trapezoidal stability profile RSWU and extends out to the wheels 12 and 14. In the larger stability region RSXT, any further lateral articulation of the steer axle 20 causes substantially the same amount of lateral articulation in frame 24.

In the embodiment of the invention described in FIGS. 5–7, the shape of bushing 50 allows vertical displacement of the steer axle center pivot point. One of ordinary skill in the art will recognize that other bushing shapes could also be used that enable a center pivot point of an axle to move vertically up and down.

Figure 8A:
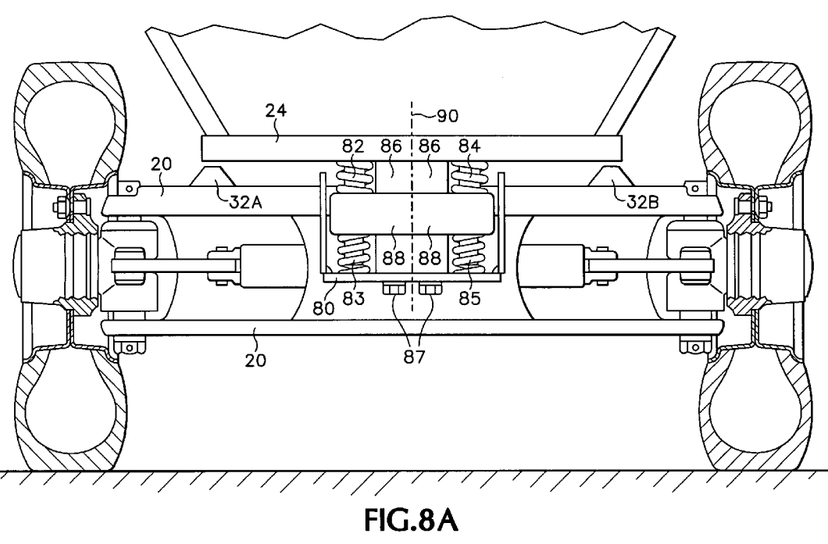
FIGS. 8A–8B are rear-sectional views of a suspension system according to another embodiment of the invention.
Figure 8B:
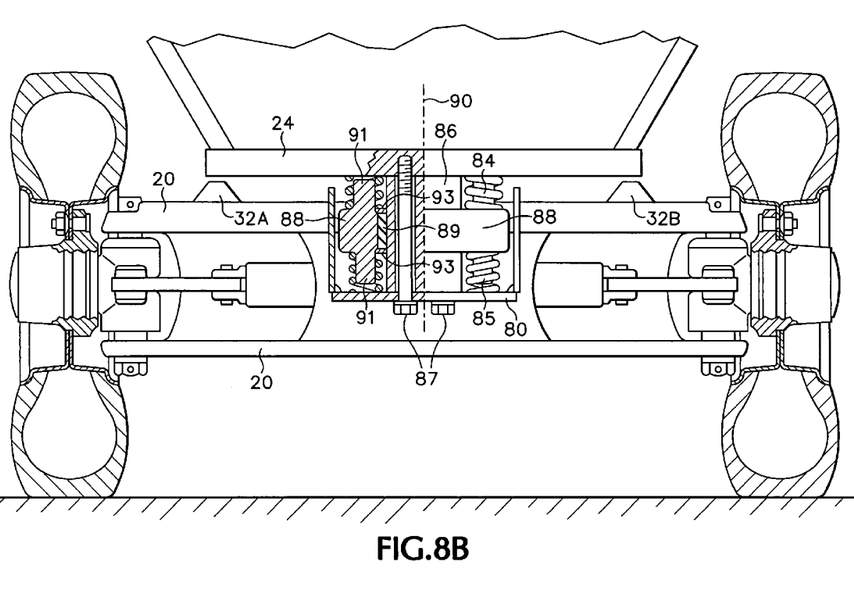

For example, FIGS. 8A and 8B show an alternative embodiment that uses compression coil springs 82, 83, 84, and 85. The upper springs 82 and 84 are somewhat larger than the lower springs 83 and 85. A mounting bracket weldment 80 attaches the steer axle 20 to frame 24. A steer axle casting 88 is formed as part of the steer axle 20 or is a separate piece rigidly welded or bolted to the steer axle 20.

Two bolts 87 are shown in FIG. 8B. Bolts 87, in addition to two other bolts that are not shown, are arranged in a square pattern. Each bolt 87 runs through an opening similar to opening 86 (FIG. 8B) in the mounting bracket weldment 80 attaching to the frame 24. The steer axle casting 88 includes T shaped posts 91 on opposite ends that insert inside of both the upper springs 82 and 84 and inside the lower springs 83 and 85. A rubber bushing 89 sits between the steer axle casting 88 and weldment 80. The weldment 80 is mounted to the vehicle frame. Washers 93 retain the rubber bushing 89 and protect the bushing 89 from the springs 82, 83, 84 and 85. The frame 24 is supported on the upper springs 82 and 84.

In a first articulation range, the steer axle 20 rotates laterally about center line 90 and the articulation stops 32A and 32B do not contact frame 24. This produces a triangular stability profile similar to triangular stability profile RSV shown in FIG. 7.

If the steer axle 20 continues to articulate either clockwise or counter clockwise, the articulation stop 32A or 32B contacts frame 24 and combinations of the springs 82, 83, 84, and 85 continue to compress. This allows the steer axle casting 88 to continue to move in a downward direction in weldment 80. The steer axle 20 is allowed to pivot about the articulation stop 32A or 32B that contacts the frame 24 providing a trapezoidal stability profile similar to trapezoidal profile RSUW shown in FIG. 7.

In a third articulation range, the steer axle casting 88 fully compresses a combination of the springs 82, 83, 84, and 85. The steer axle 20 in this condition has a substantially rigid non-pivoting contact with frame 24. The suspension system in this state exhibits a larger stability profile approaching a rectangular shape similar to the stability profile RSXT shown in FIG. 7.

Other spring designs such as Bellville springs may be used for providing the variable suspension profiles shown above. Alternatively, a single traverse set of variable leaf springs that are stiffer in the upward direction than in the downward direction can be used to bridge the front and rear mounting locations of the steer axle 20. For example, the leaf springs can bridge the locations where brackets 22A and 22B are located in FIG. 2. Any other different combination of springs or bushings can also be used to vary the stability profiles of the lift truck as described above.

The embodiment of the invention described in FIGS. 5–7 is a passive system. That is, the bushing 50 merely reacts to laterally applied forces. One of ordinary skill in the art will recognize that an active system may also be used to perform the same function. For example, a hydraulic system may be used to directly raise or lower the center pivot point 25 (FIG. 5) of the steer axle 20 according to sensor inputs. Active systems could also adaptively adjust a spring constant of the movable pivot point according to the weight of the load carried by the lift truck or the degree of lateral inclination of the lift truck.

Having described and illustrated the principles of the invention in a preferred embodiment thereof, it should be apparent that the invention may be modified in arrangement and detail without departing from such principles. We claim all modifications and variation coming within the spirit and scope of the following claims.

What is claimed is:

1. An apparatus comprising:
    a coupling device coupled to an axle and to a vehicle frame at an approximate centerline location, the coupling device providing spaced apart discrete fixed suspension pivot points for the axle with respect to the frame according to a lateral inclination of the axle,
    the coupling device holding the frame to the axle while at the same time allowing the axle to pivot about a first discrete fixed pivot point at the centerline location within the coupling device while the axle is within a first articulation range,
    the coupling device further compressing and decompressing in a vertical direction to allow an overall position of the axle to move vertically up and down in the coupling device when the axle is within a second articulation range outside of the first articulation range allowing a pivot point for the axle to move from the first discrete fixed pivot point directly to a second spaced apart laterally extended discrete fixed pivot point at a lateral end location on the axle where the axle first contacts a lateral end of the frame.

2. The apparatus of claim 1 wherein the coupling device restricts lateral movement of an axle center point with respect to the frame while allowing vertical movement of the axle center point with respect to the frame.

3. The apparatus according to claim 2 wherein the coupling device maintains a stop on the axle in substantially rigid non-pivoting contact with the frame after the axle exceeds a given inclination range.

4. The apparatus of claim 1 wherein the coupling device comprises an elastomeric bushing.

5. The apparatus of claim 1 wherein the coupling device comprises springs retaining a center extension of the axle.

6. The apparatus according to claim 1 including:
    articulation stops located on lateral ends of the axle, the coupling device allowing the axle to rotate about a center line of the axle when the articulation stops are not contacting the vehicle frame and the coupling device allowing the axle to rotate about one of the articulation stops when that articulation stop is in contact with the vehicle frame.

7. The apparatus according to claim 1 wherein the elastomeric bushing comprises a unitary piece of rubber.

8. An apparatus comprising:
    a coupling device coupling an axle to a vehicle frame, the coupling device providing variable suspension pivot points for the axle with respect to the frame according to a lateral inclination of the axle, wherein the coupling device comprises an elastomeric bushing and the bushing includes cavities formed in a bottom end for promoting vertical compression.

9. An apparatus comprising:
    a coupling device coupling an axle to a vehicle frame, the coupling device providing variable suspension pivot points for the axle wit respect to the frame according to a lateral inclination of the axle, wherein the coupling device comprises an elastomeric bushing formed from a unitary piece of rubber having a center hole for receiving an axle extension, the bushing allowing the extension to rotate about a center axis, the elastomeric bushing including a first top main elastomeric section with a first amount of vertical compaction capacity and including a second bottom section that has more vertical compaction capacity than the first section that enables the center axis to move vertically downward when a sufficient downward force is applied by the extension.

10. An apparatus comprising:
    a coupling device compressingly coupled to an axle and rigidly coupled to a vehicle frame at an approximate centerline location, the coupling device providing variable suspension pivot points for the axle with respect to the frame according to a lateral inclination of the axle,
    the coupling device holding the frame to the axle in a substantially stable vertical relationship while at the same time allowing the axle to rotate within the coupling device while the axle is within a first articulation range while,
    compressing and decompressing to allow the axle to move vertically up and down in the coupling device when the axle is within a second articulation range outside of the first articulation range; and
    wherein the vehicle frame produces a triangular stability profile when the axle is in a first articulation range, a trapezoidal stability profile when the axle is in a second articulation range, and a third larger stability profile approaching a rectangular shape when the axle is in a third articulation range.

11. An apparatus comprising;
    a coupling device coupling an axle to a vehicle frame, the coupling device providing different discrete spaced apart fixed suspension pivot points for the axle with respect to the frame according to a lateral inclination of the axle; and
    articulation stops located on lateral ends of the axle, the coupling device allowing the axle to pivot about a first center line of the axle when the articulation stops are not contacting the vehicle frame and the coupling device further allowing the axle to shift from the centerline pivot location directly to a second fixed lateral pivot location where that articulation stop initiates contact with the vehicle frame, the coupling device enabling the axle to continue to pivot at the second pivot location in a same direction that first initiated contact of the articulation stop with the vehicle frame and also pivot in an opposite direction at the same second pivot location until the articulation stop no longer contacts the vehicle frame.

12. A method for providing vehicle suspension, comprising:
    coupling an axle to a vehicle frame at a first location approximately about a centerline with respect to the vehicle frame so that the axle has a first fixed discrete pivot point at approximately the same first location when the axle operates within a first articulation range that includes multiple different articulation angles;

maintaining a spacing between the lateral ends of the axle and lateral ends of the vehicle frame when the axle operates within the first articulation range; and moving the axle pivot point from the first location directly to a second discrete laterally spaced apart pivot location extending laterally out from the first location when the axle operates within a second articulation range that includes multiple different articulation angles that are all larger than the articulation angles in the first articulation range.

13. The method of claim 12 including providing a first stability profile when the axle pivots about the first location, a second larger stability profile when the axle pivots about the second location and providing a third stability profile larger than the second stability profile when the axle has a third range of articulation greater than the second range of articulation.

14. The method of claim 12 including rotating the axle about the first location when the axle is within the first articulation range and changing the axle from rotating to move vertically up and down at the first location when the axle moves into the second articulation range.

15. The method of claim 12 including:

providing articulation stops on lateral ends of the axle that maintain the spacing between the lateral ends of the axle and the lateral ends of the vehicle frame when in the first articulation range; and pivoting the axle about the first location when the axle operates within the first articulation range and pivoting the axle about one of the articulation stops that contact the vehicle frame in a second articulation range.

16. The method of claim 12 including retaining a center location of the axle at substantially a same distance from the vehicle frame when the axle operates within the first articulation range and allowing the center location of the axle to vary or move vertically away from the vehicle frame when operating in the second articulation range.

17. The method according to claim 16 including retaining the axle in a substantially rigid contact with the vehicle frame when the axle operates in a third articulation range greater than the second articulation range.

18. A vehicle suspension system, comprising:

a vehicle frame;

an axle; and an attachment mechanism rigidly attached at a center axis of the vehicle frame and coupling the vehicle frame to the axle so that the axle pivots at different lateral positions in relationship to the frame according to an amount of angular displacement of the axle, the axle pivoting against the attachment mechanism only at a first discrete location when the axle has a first range of angular displacement and the axle shifting from the first discrete location directly to pivoting against one of two opposite outwardly lateral discrete locations on the frame that are each laterally spaced apart from the first discrete location when there is a second larger range of angular displacement of the axle.

19. The suspension system of claim 18 wherein the axle comprises a steer axle.

20. The suspension system of claim 18 wherein the attachment mechanism retains an axle extension and allows the axle extension to move vertically up and down inside the attachment mechanism when said lateral locations of the vehicle frame and axle come into contact.

21. A vehicle suspension system, comprising:

a vehicle frame;

an axle;

an attachment mechanism coupling the axle to the vehicle frame so that the axle pivots at different discrete spaced apart fixed lateral positions in relationship to the frame according to an amount of angular displacement of the axle; and articulation stops located on apposite sides of the axle each maintaining an articulation gap with the vehicle frame when the axle operates within a first range of lateral displacement.

22. The suspension system according to claim 21 wherein the axle pivots about a first central axis of the axle when the axle operates within the first range of lateral displacement and pivots about one of the articulation stops when that articulation stop contacts the vehicle frame and the axle operates within a second range of lateral displacement.

23. The suspension system of claim 22 wherein the attachment mechanism prevents further pivoting of the axle about the contacting articulation stop when the axle operates within a third range of lateral displacement greater than the second range of lateral displacement.

24. The suspension system of claim 20 wherein the attachment mechanism includes a rubber bushing.

25. The suspension system of claim 20 wherein the attachment mechanism includes springs.

26. The suspension system of claim 20 wherein the attachment mechanism includes a rubber bushing having first main elastomeric section with a first amount of compaction capacity and a second section that has more compaction capacity than the first section.

27. An apparatus comprising:

a coupling device coupling an axle to a vehicle frame, the coupling device providing variable suspension pivot points for the axle with respect to the frame according to a lateral inclination of the axle, wherein the coupling device comprises an elastomeric bushing having a center hole for receiving an axle extension, the bushing allowing the extension to rotate about a center axis during a fast articulation range of the axle and also allowing the entire extension to move vertically downward in the elastomeric bushing during a second greater articulation range of the axle.

28. The apparatus of claim 27 wherein the vehicle frame produces a first single discrete triangular stability profile whenever the axle is in the first articulation range, a second discrete fixed trapezoidal stability profile when the axle is in the second articulation range, and a third larger stability profile approaching a rectangular shape when the axle is in a third articulation range.

* * * * *

UNITED STATES PATENT AND TRADEMARK OFFICE
CERTIFICATE OF CORRECTION

PATENT NO. : 6,959,936 B2
APPLICATION NO. : 10/318434
DATED : November 1, 2005
INVENTOR(S) : Anderson et al.

It is certified that error appears in the above-identified patent and that said Letters Patent is hereby corrected as shown below:

At column 6, line 8 please replace "axle wit respect" with --axle with respect--
At column 8, line 15 please replace "apposite" with --opposite--
At column 8, line 48 please replace "fast articulation" with --first articulation--

Signed and Sealed this

Ninth Day of January, 2007

JON W. DUDAS
*Director of the United States Patent and Trademark Office*